United States Patent
Querel et al.

(10) Patent No.: US 7,935,158 B2
(45) Date of Patent: May 3, 2011

(54) BONDED ABRASIVE ARTICLE AND METHOD OF MAKING

(75) Inventors: Gilles Querel, Worcester, MA (US); Cecile Jousseaume, Paris (FR); Paul S. Dando, Rudford Glos (GB); Richard W. Hall, Southborough, MA (US)

(73) Assignees: Saint-Gobain Abrasives, Inc., Worcester, MA (US); Saint-Gobain Abrasifs, Confians-Sainte-Honorine (FR)

( * ) Notice: Subject to any disclaimer, the term of this patent is extended or adjusted under 35 U.S.C. 154(b) by 296 days.

(21) Appl. No.: 12/048,123

(22) Filed: Mar. 13, 2008

(65) Prior Publication Data

US 2008/0222965 A1    Sep. 18, 2008

Related U.S. Application Data

(60) Provisional application No. 60/894,873, filed on Mar. 14, 2007.

(51) Int. Cl.
  *C09K 3/14*  (2006.01)
  *C09C 1/68*  (2006.01)
(52) U.S. Cl. ............. 51/298; 51/307; 51/308; 51/309
(58) Field of Classification Search ............ 51/307, 51/308, 309, 298
  See application file for complete search history.

(56) References Cited

U.S. PATENT DOCUMENTS

| | | |
|---|---|---|
| 4,260,397 A | 4/1981 | Bovenkerk |
| 5,095,665 A | 3/1992 | Nagata et al. |
| 5,106,392 A | 4/1992 | Slutz et al. |
| 5,139,537 A | 8/1992 | Julien |
| 5,211,726 A | 5/1993 | Slutz et al. |
| 5,300,129 A | 4/1994 | Clark |
| 5,318,605 A | 6/1994 | Carman |
| 5,328,875 A | 7/1994 | Ueda et al. |
| 5,466,642 A | 11/1995 | Tajima et al. |
| 5,607,489 A | 3/1997 | Li |
| 6,123,743 A | 9/2000 | Carman et al. |
| 6,123,744 A | 9/2000 | Huzinec |
| 6,679,758 B2 | 1/2004 | Bright et al. |
| 6,702,650 B2 | 3/2004 | Adefris |
| 6,790,126 B2 | 9/2004 | Wood et al. |
| 6,802,878 B1 * | 10/2004 | Monroe ..................... 51/307 |
| 2004/0185754 A1 | 9/2004 | Adefris et al. |
| 2005/0101225 A1 | 5/2005 | Bright et al. |
| 2006/0021285 A1* | 2/2006 | Rosenflanz et al. |
| 2006/0160476 A1 | 7/2006 | Bright et al. |

FOREIGN PATENT DOCUMENTS

| | | | |
|---|---|---|---|
| EP | 0571865 A | * | 12/1993 |
| EP | 0577375 A1 | | 1/1994 |
| EP | 0946332 B1 | | 10/1999 |
| EP | 1100654 B1 | | 5/2001 |
| JP | 6211542 | | 8/1994 |
| JP | 2003-205466 A | * | 7/2003 |
| WO | 89/02344 A | * | 3/1989 |
| WO | 01/70463 A | | 9/2001 |

OTHER PUBLICATIONS

Yang, J. et al., "Effect of Glass Composition on the Strength of Vitreous Bonded c-BN Grinding Wheels," Cermaics International, vol. 19, pp. 87-92, 1993.

Yokogawa, M., et al., "Effects of the Abrasive Retention of CBN Wheels on Grinding Performance," Bull. Japan Soc. of Prec. Engg., vol. 20, No. 4, pp. 231-238, Dec. 1986.

* cited by examiner

*Primary Examiner* — Elizabeth D Wood
(74) *Attorney, Agent, or Firm* — Larson Newman & Abel LLP

(57) ABSTRACT

A bonded abrasive article is provided which includes abrasive grains made of cubic boron nitride within a bond matrix including a silicate. The bonded abrasive further includes a reaction product at the interface between the abrasive grains and bond matrix comprising a transition metal nitride.

21 Claims, 3 Drawing Sheets

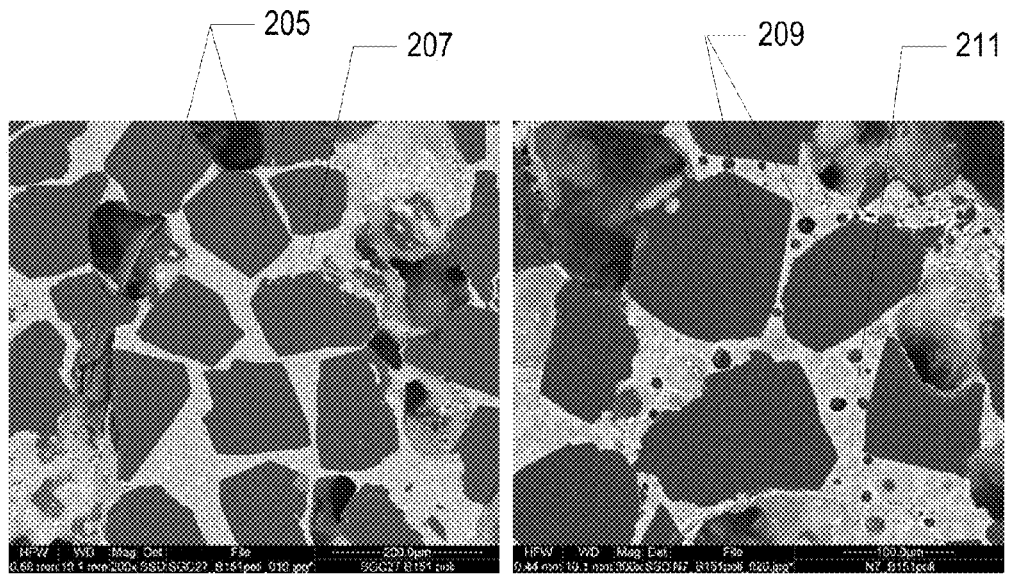
*FIG. 2a*  *FIG. 2b*
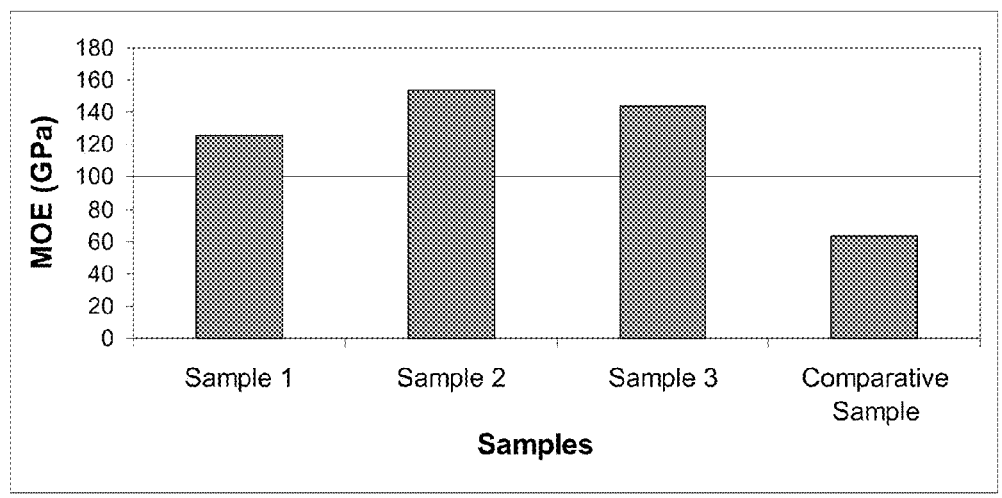
*FIG. 3*

BONDED ABRASIVE ARTICLE AND METHOD OF MAKING

CROSS-REFERENCE TO RELATED APPLICATION(S)

The present application claims priority from U.S. Provisional Patent Application No. 60/894,873, filed Mar. 14, 2007, entitled "BONDED ABRASIVE ARTICLE AND METHOD OF MAKING", naming inventors Gilles Querel, Cecile Jousseaume, Paul S. Dando, and Richard W. Hall, which application is incorporated by reference herein in its entirety.

BACKGROUND

1. Field of the Disclosure

The present disclosure is directed to bonded abrasive articles and particularly directed to bonded abrasive articles having a crystalline bond matrix.

2. Description of the Related Art

Abrasives are generally utilized in various machining operations, ranging from fine polishing to bulk material removal and cutting. For example, free abrasives composed of loose particles are used in slurries for polishing applications such as chemical mechanical polishing (CMP) in the semiconductor industry. Alternatively, abrasives can be in the form of fixed abrasive articles such as bonded and coated abrasives which can include devices such as grinding wheels, belts, rolls, disks and the like.

Fixed abrasives generally differ from free abrasives in that fixed abrasives utilize abrasive grains or grit within a matrix of material that fixes the position of the abrasive grains relative to each other. Common fixed abrasive grits can include alumina, silicon carbide, various minerals such as garnet, as well as superabrasives such as diamond and cubic boron nitride (cBN). In particular reference to bonded abrasive articles, the abrasive grits are fixed in relation to each other in a bond material. While many different bond materials can be used, vitrified bond materials, such as an amorphous phase glass materials are common. However, performance properties of conventional bonded abrasives such as, for example aluminum oxide, silicon carbide, diamond, and cubic boron nitride having vitrified bonds are limited by the nature of the bond and the composition of the abrasive grains. Notably, the bond between the bond matrix and the abrasive grains can be insufficient such that during grinding the abrasive grains are easily removed from the bond matrix, reducing the effectiveness of the grinding or polishing process.

The industry continues to need bonded abrasives having improved properties. Properties of interest include mechanical stability, strength, operable lifetime, and improved grinding performance.

SUMMARY

According to a first embodiment, a bonded abrasive article is provided that includes abrasive grains including cubic boron nitride within a bond matrix which is made of a silicate. The bonded abrasive also includes a reaction product at the interface between the abrasive grains and bond matrix comprising a transition metal nitride.

According to a second embodiment, a method of making a bonded abrasive is provided which includes providing a glass powder made of a transition metal oxide compound. The method further includes combining the glass powder with abrasive grains having cubic boron nitride and forming the glass powder and abrasive grains to form a green article. The method further includes sintering the green article at a transformation temperature to form abrasive grains in a vitreous bond matrix, such that at the transformation temperature the transition metal oxide compound changes to a transition metal nitride compound at the interface of the abrasive grains and the vitreous bond matrix.

BRIEF DESCRIPTION OF THE DRAWINGS

The present disclosure may be better understood, and its numerous features and advantages made apparent to those skilled in the art by referencing the accompanying drawings.

FIG. 2a is an image illustrating a portion of a bonded abrasive article formed according to embodiments herein FIG. 2b is an image illustrating a portion of a bonded abrasive article formed according to conventional techniques.

FIG. 3 is a plot illustrating the modulus of elasticity (MOE) of bonded abrasive articles formed according to embodiments herein as compared to a Comparative Sample.

The use of the same reference symbols in different drawings indicates similar or identical items.

DESCRIPTION OF THE PREFERRED EMBODIMENT(S)

Figure 1:
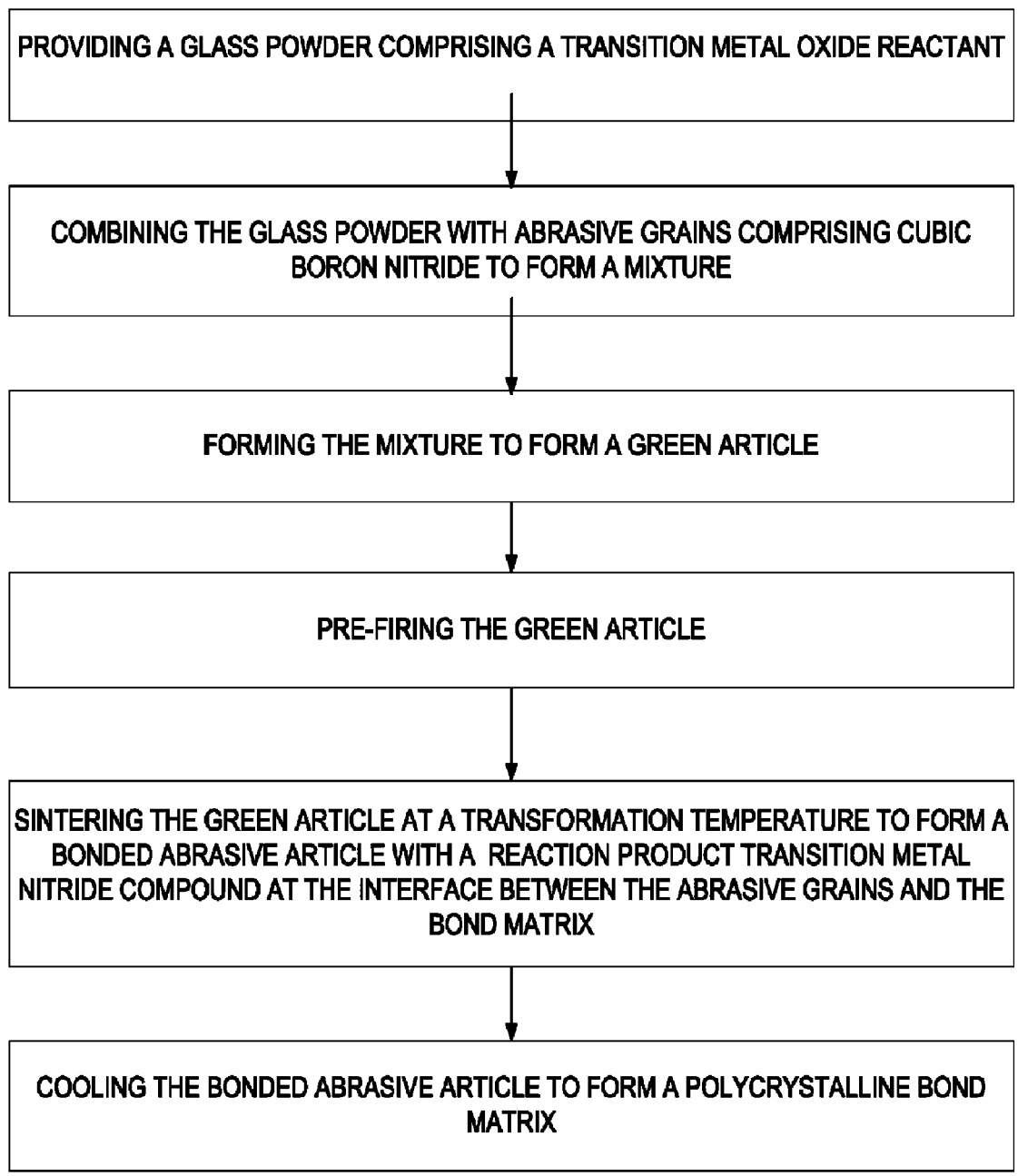
FIG. 1 is a flow chart illustrating a process of forming a bonded abrasive article according to one embodiment.

Referring to FIG. 1, a flow chart is provided illustrating a process by which a bonded abrasive is formed according to one embodiment. The process is initiated at step 101 by providing a glass powder including a transition metal oxide reactant. The powder is generally glassy (amorphous), such that not less than about 80 vol % of the glass is amorphous phase. According to a particular embodiment, the glass powder can include a greater content of amorphous phase, such as not less than about 90 vol %, or even not less than about 95 vol % amorphous phase. Generally, formation of a glass powder can be completed by mixing a suitable proportion of raw materials and melting the mixture of raw materials to form a glass at high temperatures. After sufficient melting and mixing of the glass, the glass can be cooled (quenched) and crushed to a powder.

Generally, the glass powder can be further processed, such as by a milling process, to provide a glass powder having a suitable particle size distribution. Typically, the glass powder has an average particle size of not greater than about 100 microns. In a particular embodiment, the glass powder has an average particle size of not greater than 75 microns, such as not greater than about 50 microns, or even not greater than about 10 microns. However, the average particle size of the glass powder is typically within a range of between about 5.0 microns and about 75 microns.

The composition of the glass powder can be described using the equation $aM_2O\text{-}bMO\text{-}cM_2O_3\text{-}dMO_2\text{-}eM_2O_5$. As illustrated by the equation, the glass powder composition can include metal oxides, and particularly more than one metal oxide, such that the oxides are present together as a compound oxide material. In one particular embodiment, the glass powder includes metal oxide compounds having monovalent cations ($M^{1+}$), such as those metal oxide compounds represented by the generic formula $M_2O$. Suitable metal oxide compositions represented by $M_2O$ can include compounds such as $Li_2O$, $Na_2O$, $K_2O$, and $Cs_2O$.

According to another embodiment, and as provided in the general equation, the glass powder can include other metal oxide compounds. In particular, the glass powder can include metal oxide compounds having divalent cations ($M^{2+}$), such as those metal oxide compounds represented by the generic formula MO. Suitable metal oxide compositions represented by MO can include compounds such as MgO, CaO, SrO, BaO, and ZnO.

Additionally, the glass powder can include metal oxide compounds having trivalent cations ($M^{3+}$), particularly those metal oxide compounds represented by the generic formula $M_2O_3$. Suitable metal oxide compositions represented by $M_2O_3$ can include compounds such as $Al_2O_3$, $B_2O_3$, $Y_2O_3$, $Fe_2O_3$, $Bi_2O_3$, and $La_2O_3$.

Notably, as indicated in the general equation above, the glass powder can include metal oxide compounds having cations of a $M^{4+}$ valence state, as represented by $MO_2$. Particularly suitable $MO_2$ compositions include $SiO_2$, $ZrO_2$, and $TiO_2$.

Additionally, the glass powder can include metal oxide compounds having cations of a $M^{5+}$ valence state, particularly those metal oxide compounds represented by the generic formula $M_2O_5$. Suitable metal oxide compositions represented by $M_2O_5$ can include compounds such as $V_2O_5$, and $Nb_2O_5$.

In further reference to the composition of the glass powder represented by the generic equation $aM_2O$-$bMO$-$cM_2O_3$-$dMO_2$-$eM_2O_5$, the coefficients (a, b, c, d, and e) are provided to indicate the amount (in mol %) of each of the different types of metal oxide compounds ($M_2O$, MO, $M_2O_3$, $MO_2$, and $M_2O_5$) that can be present within the glass powder. As such, coefficient "a" generally represents the total amount of the $M_2O$ metal oxide compounds within the glass powder. The total amount (mol fraction) of $M_2O$ metal oxide compounds within the glass powder is generally within a range between about $0 \leq a \leq 0.30$. According to a particular embodiment, the amount of $M_2O$ metal oxide compounds within the glass powder is within a range between about $0 \leq a \leq 0.15$, and more particularly within a range of about $0 \leq a \leq 0.10$.

In reference to the presence of MO metal oxide compounds containing a divalent cation $M^{2+}$, the total amount (mol fraction) of such compounds can be defined by the coefficient "b". Generally, the total amount of MO metal oxide compounds within the glass powder is within a range between about $0 \leq b \leq 0.60$. According to a particular embodiment, the amount of MO metal oxide compounds is within a range between about $0 \leq b \leq 0.45$, and more particularly within a range between about $0.15 \leq b \leq 0.35$.

Additionally, the amount of $M_2O_3$ metal oxide compounds containing a trivalent cation $M^{3+}$ within the glass powder are represented by the coefficient "c". As such, the total amount (mol fraction) of $M_2O_3$ oxide compounds is generally within a range of between about $0 \leq c \leq 0.60$. According to one particular embodiment, the amount of $M_2O_3$ metal oxide compounds within the glass powder are within a range between about $0 \leq c \leq 0.40$, and more particularly within a range between about $0.10 \leq c \leq 0.30$.

The amount of $MO_2$ metal oxide compounds containing a $M^{4+}$ cation as described in the general equation $aM_2O$-$bMO$-$cM_2O_3$-$dMO_2$-$eM_2O_5$ are represented by the coefficient "d". Generally, the total amount (mol fraction) $MO_2$ oxide compounds within the glass powder are within a range of between about $0.20 \leq d \leq 0.80$. In one particular embodiment, the amount of $MO_2$ metal oxide compounds within the glass powder is within a range between about $0.30 \leq d \leq 0.75$, and more particularly within a range between about $0.40 \leq d \leq 0.60$.

The presence of $M_2O_5$ metal oxide compounds containing a $M^{5+}$ cation as described in the general equation $aM_2O$-$bMO$-$cM_2O_3$-$dMO_2$-$eM_2O_5$ are represented by the coefficient "e". Generally, the total amount (mol fraction) of $M_2O_5$ oxide compounds within the glass powder are within a range of between about $0 \leq d \leq 0.20$. In one particular embodiment, the amount of $M_2O_5$ metal oxide compounds within the glass powder is within a range between about $0 \leq d \leq 0.15$, and more particularly within a range between about $0.01 \leq d \leq 0.10$.

In reference to $MO_2$ metal oxide compounds and as described above, a particularly suitable $MO_2$ metal oxide compound is silicon oxide ($SiO_2$), such that the glass powder is a silicate-based composition. In particular reference to only the presence of silicon oxide within the glass powder, typically the glass powder includes not greater than about 80 mol % silicon oxide. According to another embodiment, the glass powder includes not greater than about 70 mol %, or even not greater than about 60 mol % silicon oxide. Still, in particular embodiments, the amount of silicon oxide in the glass powder is not less than about 20 mol %. As such, the amount of silicon oxide in the glass powder is generally within a range between about 30 mol % and about 70 mol %, and particularly within a range between about 40 mol % and about 60 mol %.

In particular reference to other metal oxide compounds, certain compositions of the glass powder include aluminum oxide ($Al_2O_3$), particularly in addition to silicon oxide, such that the glass powder is an aluminum silicate. As such, in reference to embodiments utilizing aluminum oxide, generally the glass powder includes not greater than about 60 mol % $Al_2O_3$. In other embodiments, the glass powder can include aluminum oxide in lesser amounts, such as not greater than about 50 mol %, or even not greater than about 40 mol %. Typically, the glass powder incorporates aluminum oxide within a range between about 5.0 mol % to about 40 mol %, and particularly within a range between about 10 mol % and about 30 mol %.

According to other embodiments, the glass powder includes at least one of magnesium oxide (MgO) and lithium oxide ($Li_2O$), particularly in addition to silicon oxide, and more particularly in addition to silicon oxide and aluminum oxide. As such, the amount of magnesium oxide within the glass powder is generally not greater than about 45 mol %, such as not greater than 40 mol %, or even, not greater than 35 mol %. Typically, the glass powder compositions having magnesium oxide, utilize an amount within a range between about 5.0 mol % and about 40 mol %, and particularly within a range between about 15 mol % and about 35 mol %. Magnesium-containing aluminum silicate glasses may be referred to as MAS glasses having a magnesium aluminum silicate composition.

According to another embodiment, the glass powder includes lithium oxide, particularly in addition to silicon oxide, and more particularly in addition to aluminum oxide and silicon oxide. As such, the amount of lithium oxide within the glass powder is generally not greater than about 45 mol %, such as not greater than 30 mol %, or even, not greater than 20 mol %. Typically, the glass powder compositions having lithium oxide, utilize an amount within a range between about 1.0 mol % and about 20 mol %, and particularly within a range between about 5.0 mol % and about 15 mol %. Lithium-containing aluminum silicate glasses may be referred to as LAS glasses having a lithium aluminum silicate composition.

In other embodiments, the glass powder can include a certain content of barium oxide (BaO), particularly in addition to silicon oxide, and in some embodiments in addition to a system containing aluminum oxide and silicon oxide. As such, the amount of barium oxide within the glass powder is generally not greater than about 45 mol %, such as not greater than 30 mol %, or even, not greater than 20 mol %. Typically, the glass powder compositions having barium oxide, utilize an amount within a range between about 0.1 mol % and about 20 mol %, and more particularly within a range between about 1.0 mol % and about 10 mol %. Barium-containing aluminum silicate glasses may be referred to as BAS glasses having a barium aluminum silicate composition.

In other embodiments, the glass powder includes a certain amount of calcium oxide (CaO), such as in addition to a glass powder containing silicon oxide, and in particular embodiments, in a glass powder containing aluminum oxide and silicon oxide. As such, the amount of calcium oxide within the glass powder is generally not greater than about 45 mol %, such as not greater than 30 mol %, or even, not greater than 20 mol %. Typically, the glass powder compositions having calcium oxide utilize an amount within a range between about 0.5 mol % and about 20 mol %, and particularly within a range between about 1.0 mol % and about 10 mol %. In some embodiments, calcium oxide is present in systems utilizing other metal oxide compounds mentioned above, notably in combination with the MAS or BAS glasses. As such, the calcium oxide can form a compound oxide, for example a calcium magnesium aluminum silicate (CMAS) or calcium barium magnesium aluminum silicate (CBAS).

As described above, the glass compositions can include other metal oxide compounds. According to a particular embodiment, the glass powder composition includes boron oxide ($B_2O_3$). Generally, the amount of boron oxide within the glass powder is not greater than about 45 mol %, such as not greater than 30 mol %, or even, not greater than 20 mol %. Typically, the glass powder compositions having boron oxide utilize an amount within a range between about 0.5 mol % and about 20 mol %, and particularly within a range between about 2.0 mol % and about 10 mol %.

In particular reference to the transition metal oxide reactants within the glass powder, as used herein, the term "transition metal oxide reactant" refers to a select group of transition metal oxide compounds which are provided in the glass powder and react during the sintering of the bonded abrasive to form a metal nitride compound. Accordingly, suitable transition metal oxide reactants include $TiO_2$, $Cr_2O_3$, $V_2O_5$, $ZrO_2$, and $Nb_2O_5$ and combinations or complex oxides thereof.

While the foregoing description has been directed to the presence of generic oxide compounds such as MO, $M_2O$, $M_2O_3$, $M_2O_5$, and $MO_2$, the following description is particularly directed to the presence of those metal oxide compounds that are used herein as transition metal oxide reactants as described above. Generally, the total amount of transition metal oxide reactants within the glass powder is not greater than about 25 mol %. According to a particular embodiment, the total amount of transition metal oxide reactants in the glass powder can be less, such as not greater than about 20 mol %, such as not greater than about 15 mol %, or even not greater than about 10 mol %. Typically, the total amount of transition metal oxide reactants is within a range between about 1.0 mol % and about 20 mol % and particularly within a range between about 2.0 mol % and about 15 mol %.

In particular reference to the transition metal oxide reactant $TiO_2$, this reactant can be present in addition to other oxides, particularly in addition to silicon oxide, and particularly in addition to aluminum oxide and silicon oxide. Generally, the glass powder contains an amount of titanium oxide not greater than about 20 mol %. According to another embodiment, the glass powder includes not greater than 15 mol % $TiO_2$. Typically, glass powder compositions having the transition metal oxide reactant $TiO_2$ utilize an amount within a range between about 1.0 mol % and about 15 mol %, and more particularly within a range between about 2.0 mol % and about 10 mol %.

In particular reference to the transition metal oxide reactant $Cr_2O_3$, this reactant can be present in addition to other oxides, particularly in addition to silicon oxide, and particularly in addition to aluminum oxide and silicon oxide. Generally, in an amount of chromium oxide in the glass powder is not greater than about 20 mol %. Still, the glass powder can contain less, such as not greater than 15 mol % $Cr_2O_3$. Typically, glass powder compositions having the transition metal oxide reactant $Cr_2O_3$ utilize an amount within a range between about 1.0 mol % and about 15 mol %, and more particularly within a range between about 2.0 mol % and about 10 mol %.

In particular reference to the transition metal oxide reactant $V_2O_5$, generally this reactant is present in addition to other oxides, particularly in addition to silicon oxide, and particularly in addition to aluminum oxide and silicon oxide. Generally, the glass powder includes not greater than about 20 mol % $V_2O_5$. According to another embodiment, the glass powder includes not greater than 15 mol % $V_2O_5$. Typically, the transition metal oxide reactant $V_2O_5$ is utilized in an amount within a range between about 1.0 mol % and about 15 mol %, and more particularly within a range between about 2.0 mol % and about 10 mol %.

In particular reference to the presence of $ZrO_2$, this reactant can be present in addition to other oxides, particularly in addition to silicon oxide, and particularly in addition to aluminum oxide and silicon oxide. As a transition metal oxide reactant in the glass powder, generally, the glass powder contains not greater than about 20 mol % $ZrO_2$. According to another embodiment, the glass powder includes not greater than 15 mol % $ZrO_2$. Typically, the transition metal oxide reactant $ZrO_2$ is present in an amount within a range between about 1.0 mol % and about 15 mol %, and more particularly within a range between about 2.0 mol % and about 10 mol %.

In particular reference to the transition metal oxide reactant $Nb_2O_5$, this reactant can be present in addition to other oxides, particularly in addition to silicon oxide, and particularly in addition to aluminum oxide and silicon oxide. Generally, the glass powder contains an amount of $Nb_2O_5$ not greater than about 20 mol %. According to another embodiment, the glass powder includes not greater than 15 mol % $Nb_2O_5$. Typically, glass powder compositions having the transition metal oxide reactant $Nb_2O_5$ utilize an amount within a range between about 1.0 mol % and about 15 mol %, and more particularly within a range between about 2.0 mol % and about 10 mol %.

After providing the glass powder at step 101, the process continues at step 103 by combining the glass powder with abrasive grains comprising cubic boron nitride to form a mixture. In reference to the composition of the mixture, generally the mixture includes not less than about 25 vol % abrasive grains. According to a particular embodiment, the mixture includes not less than about 40 vol % abrasive grains, such as not less than about 45 vol %, or even not less than about 50 vol % abrasive grains. Still, the amount of abrasive grains is limited such that the mixture generally includes not greater than about 60 vol % abrasive grains. In particular, the abrasive grains within the mixture are generally present in an amount within a range between about 30 vol % and about 60 vol %.

In reference to the abrasive grains, the abrasive grains include hard, abrasive materials, and particularly include superabrasive materials such as cubic boron nitride. Still, according to a particular embodiment, the abrasive grains include cubic boron nitride, and more particularly, the abrasive grains consist essentially of cubic boron nitride. In certain embodiments, a certain percentage of the abrasive grains which generally are otherwise cubic boron nitride can be replaced with substitute abrasive grains, such as aluminum oxide, silicon carbide, boron carbide, tungsten carbide, and zirconium silicate. As such, the amount of substitute abrasive grains is generally not greater than about 40 vol % of the total abrasive grains, such as not greater than about 25 vol %, or even not greater than about 10 vol %.

The abrasive grains generally have an average grain size of not greater than about 500 microns. Particularly, the average grain size of the abrasive grains is not greater than about 200 microns, or even not greater than about 100 microns. Generally, the average grain size is within a range of between about 1.0 microns and about 250 microns, and particularly within a range of between about 35 microns and about 180 microns.

In reference to the amount of glass powder combined with the abrasive grains in the mixture, the mixture can include not less than about 10 vol % glass powder, such as not less than about 15 vol % glass powder. Still, the amount of glass powder is limited, such that the mixture includes not greater than about 60 vol % glass powder, such as not greater than about 50 vol % glass powder, or even not greater than about 400 vol % glass powder. In particular, the mixture generally includes an amount of glass powder within a range between about 10 vol % and about 30 vol %.

The mixing process can include a dry mix process or a wet mix process. Particularly, the mixing process includes a wet mix process, such that at least one liquid is added to facilitate mixing of the glass powder and abrasive grains. According to a particular embodiment, the liquid is water. In such embodiments, water is added in an amount suitable to facilitate adequate mixing and as such, the mixture generally contains at least about 6.0 vol % water, such as at least about 10 vol %. Still, the mixture generally includes not greater than about 20 vol % water, such as not greater than about 15 vol % water.

The mixture can include other additives, such as a binder. Generally, the binder is an organic material. Suitable binder materials can include organic materials containing glycol (e.g., polyethylene glycol), dextrin, resin, glue, or alcohol (e.g., polyvinyl alcohol), or combinations thereof. Generally, the mixture includes not greater than about 15 vol % of a binder, such as not greater than about 10 vol %. According to one particular embodiment, the binder is provided in the mixture within a range between about 2.0 vol % and about 10 vol %.

In further reference to other additives, the mixture can include pore formers or a pore inducing material to facilitate formation of a porous final bonded abrasive structure. Accordingly, pore formers generally include inorganic or organic materials. Typically suitable organic materials can include polyvinyl butyrate, polyvinyl chloride, wax (e.g., polyethylene wax), plant seeds, plant shells, sodium diamyl sulfosucanate, methyl ethyl ketone, naphthalene, polystyrene, polyethylene, polypropylene, acrylic polymers, p-dichlorobenzene, and combinations thereof. Such pore formers are typically provided in a particulate form such that upon heating the particulate material is evolved and a pore is left behind. Accordingly, the pore former has an average particulate size of not greater than about 0.5 mm, or even not greater than about 0.05 mm. Moreover, suitable inorganic materials can include beads of inorganic material, particularly hollow spheres of such materials as glasses, ceramics or glass-ceramics, or combinations thereof.

Typically, the amount of the pore former provided in the mixture is not greater than about 35 vol %. In another embodiment, the mixture includes not greater than about 30 vol % of the pore former, such as not greater than about 20 vol %, or even not greater than about 15 vol % of the pore former. According to a particular embodiment, the mixture includes an amount of pore former in a range of between about 1.0 vol %, and about 35 vol %, and more particularly within a range between about 5.0 vol % and about 25 vol %.

Moreover, it will be appreciated that the mixture can include "natural porosity" or the existence of bubbles or pores within the mass of the mixture of abrasive grains, glass powder, and other additives. Accordingly, this natural porosity can be maintained in the final bonded abrasive article depending upon the forming techniques. As such, in particular embodiments, pore formers may not be used and the natural porosity within the mixture may be utilized and maintained throughout the forming and sintering process to form a final bonded abrasive article having the desired amount of porosity. Generally, the natural porosity of the mixture is not greater than about 40 vol %. Although, in particular embodiments the natural porosity within the mixture is less, such as not greater than about 25 vol %, or not greater than about 15 vol %. Generally, the amount of natural porosity within the mixture is within a range between about 5.0 vol % and about 25 vol %.

While the mixing step can include mixing the glass powder, abrasive grains and other components described above, according to a particular embodiment, the binder and the abrasive grains can be first mixed in the water. The water with the additional components (i.e., the abrasive grains and the binder) can then be combined with the glass powder, and if present, the pore former.

Referring again to FIG. 1, after mixing the glass powder with abrasive grains at step 103, the method continues at step 105, by forming the mixture to form a green article. Forming of the mixture into a green article can include forming processes that gives the green article the desired final contour or substantially the desired final contour. As used herein, the term "green article" refers to a piece that is not fully sintered. Accordingly, forming processes can include processes such as casting, molding, extruding, and pressing, or combinations thereof. According to a one embodiment, the forming process is a molding process.

After forming the green article at step 105, the process continues at step 107 and includes pre-firing the green article. Generally the pre-firing step includes heating the green article to facilitating evolving volatiles (e.g., water and/or organic materials or pore formers). As such, heating of the mixture generally includes heating to a temperature of greater than about room temperature (22° C.). According to one embodiment, the pre-firing process includes heating the green article to a temperature of not less than about 100° C., such as not less than about 200° C., or even not less than about 300° C. According to a particular embodiment, heating is completed between a temperature of about 22° C. and about 850° C.

After pre-firing the green article at step 107, the process continues at step 109, by sintering the green article at a transformation temperature to form a bonded abrasive article including abrasive grains in a bond matrix and a reaction product transition metal nitride compound at the interface of the abrasive grains and the bond matrix. Generally, the transformation temperature is a temperature that is sufficient to change a substantial portion of the transition metal oxide reactant present in the glass powder to a transition metal nitride compound. Accordingly, the transformation temperature is generally not less than about 800° C. Other embodiments utilize a higher transformation temperature, such as not less than about 1000° C., or not less than about 1200° C., or even not less than about 1300° C. The transformation temperature is generally within a range between about 1000° C. and about 1800° C., and particularly within a range between about 1100° C. and about 1500° C.

Sintering is generally carried out in a controlled atmosphere. According to one embodiment, such as controlled atmosphere can include a non-oxidizing atmosphere. Examples of a non-oxidizing atmosphere can include an inert atmosphere, such as one using a noble gas. According to one embodiment, the atmosphere consists of nitrogen, such as not less than about 90 vol % nitrogen. Other embodiments utilize a greater concentration of nitrogen, such as not less than about 95 vol %, or even not less than 99.99 vol %, such that the atmosphere consists essentially of nitrogen. According to one embodiment, the process of sintering in a nitrogen atmosphere begins with an initial evacuation of the ambient atmosphere to a reduced pressure of not greater than about 0.05 bar. In a particular embodiment, this process is repeated such that the sintering chamber is evacuated numerous times. After the evacuation, the sintering chamber can be purged with oxygen-free nitrogen gas.

In further reference to the sintering process, such as process is carried out for a particular duration. Generally, sintering is carried out for a duration of not less than about 10 minutes. According to another embodiment, sintering is carried out for a duration such as not less than about 60 minutes, or even not less than about 240 minutes at the sintering temperature. Typically, sintering is carried out for a duration between about 20 minutes and about 4 hours, and particularly between about 30 minutes and about 2 hours.

Additionally, during sintering at the transformation temperature, the bond matrix generally has a high content of an amorphous phase, such as not less than about 50 vol % amorphous. More typically, the bond matrix has a higher content of amorphous phase, such as not less than about 60 vol %, or not less than about 70 vol %, or even not less than about 80 vol %. The high content of amorphous phase facilitates transformation of the transition metal oxide reactant to a transition metal nitride compound at the interface of the abrasive grains and bond matrix.

After sintering at step 109, the bonded abrasive can undergo further optional processing at step 111, which includes a cooling operation to form a bond matrix having a polycrystalline ceramic phase. For example, the bonded abrasive can undergo a controlled cooling and optional controlled crystallization to facilitate crystallization of the bond matrix material. In such operations, generally the cooling rate from the sintering temperature is not greater than about 50° C./min. Other embodiments can utilize a lower ramp rate, such as not greater than about 40° C./min, or even not greater than about 30° C./min. According to a particular embodiment, cooling is undertaken at a rate of not greater than about 20° C./min.

Additionally, the controlled cooling and crystallization process can include a hold process wherein the bonded abrasive article is held at a crystallization temperature above the glass transition temperature ($T_g$) of the bond matrix material. Typically, the bonded abrasive article can be cooled to a temperature of not less than about 100° C. above $T_g$, such as not less than about 200° C. above $T_g$, or even not less than about 300° C. above $T_g$. Generally, the crystallization temperature is not less than about 800° C., such as not less than about 900° C., or even not less than about 1000° C. Particularly, the crystallization temperature is within a range between about 900° C. to about 1300° C., and more particularly within a range between about 950° C. to about 1200° C.

The bonded abrasive article is generally held at the crystallization temperature for a duration of not less than about 10 min. In one embodiment, the bonded abrasive article is held at the crystallization temperature for not less than about 20 min, such as not less than about 60 min, or even not less than about 2 hours. Typical durations for holding the bonded abrasive at the crystallization temperature are within a range between about 30 min to about 4 hours, and particularly within a range between about 1 hour to about 2 hours. It will be appreciated, that the atmosphere during this optional cooling and crystallization process is the same as the atmosphere during the sintering process and accordingly includes an controlled atmosphere, particularly an oxygen-free, nitrogen-rich atmosphere.

In such embodiments utilizing a cooling operation, the bond matrix can have a significant polycrystalline ceramic phase, such that not less than about 50 vol % of the bond matrix is crystalline. According to a particular embodiment, not less than about 60 vol %, or not less than about 75 vol %, or even not less than about 90 vol % of the bond matrix can be crystalline.

Generally, the polycrystalline ceramic phase includes a plurality of crystallites or crystalline grains which have an average size of not less than about 0.05 microns. In one particular embodiment, the average crystallite size is not less than about 1.0 micron, such as not less than about 10 microns, or even not less than about 20 microns. Still, the average crystallite size is generally not greater than about 100 microns, such that the average crystallite size is within a range between about 1.0 microns and 100 microns.

Generally, the composition of the crystallites of the polycrystalline ceramic phase can include silicon oxide, aluminum oxide, or a combination of both. As such, the crystallites of the polycrystalline ceramic phase can include crystals such as beta-quartz, which can incorporate other metal oxides incorporated in the initial glass powder, in a solid solution. In particular, the polycrystalline ceramic phase can include an aluminum silicate phase. According to another particular embodiment, the crystallites of the polycrystalline ceramic phase can include compound oxide crystals, such as for example, cordierite, enstatite, sapphirine, anorthite, celsian, diopside, spinel, and beta-spodumene, wherein the beta-spodumene in particular is found in a solid solution.

Still, a portion of the bond matrix may also include an amorphous phase. The amorphous phase, like the polycrystalline ceramic phase, can include silicon oxide and aluminum oxide and additional metal oxide species that may be present within the original glass powder. Typically, the amorphous phase is present in an amount not greater than about 50 vol % of the total volume of the bond matrix. As such, an amorphous phase is generally present in a minority amount, such that it is present in an amount not greater than about 40 vol %, such as not greater than about 30 vol %, or less, such as not greater than about 15 vol %. According to a particular embodiment, an amorphous phase is present in an amount of between about 0 vol % to about 40 vol %, and more particularly within a range between about 5.0 vol % and about 20 vol %.

In the final formed bonded abrasive article, the abrasive grains generally comprise not less than about 25 vol % of the total volume of the bonded abrasive article. According to embodiments, the abrasive grains generally comprise not less than about 35 vol %, such as not less than about 45 vol %, or even not less than about 50 vol % of the total volume of the final formed bonded abrasive article. According to one particular embodiment, the abrasive grains comprise between about 35 vol % and about 60 vol % of the total volume of the final formed abrasive article.

The bonded abrasive article generally includes a degree of porosity that is not less than about 5.0 vol % of the total volume of the bonded abrasive article. Typically, the amount of porosity is more, such that the porosity is not less than about 10 vol %, such as not less than about 15 vol %, about 20 vol %, or even, not less than about 30 vol % of the total volume of the bonded abrasive. Still, the amount of porosity is limited, such that the porosity is not greater than about 70 vol %, such as not greater than about 60 vol %, or even not greater than about 50 vol %. According to a particular embodiment, the porosity of the bonded abrasive article is within a range of between about 20 vol % and about 50 vol %. Such porosity is generally a combination of both open and closed porosity.

In further reference to the porosity of the bonded abrasive article, the average pore size is generally not greater than about 500 microns. In one embodiment, the average pore size is not greater than about 250 microns, such as not greater than about 100 microns, or even not greater than 75 microns. According to a particular embodiment, the average pore size is within a range between about 1.0 microns and about 500 microns, and particularly within a range between about 10 microns and about 250 microns.

Generally, the bond matrix is present in an amount of not greater than about 60 vol % of the total volume of the final formed bonded abrasive article. As such, the bonded abrasive generally includes not greater than about 50 vol % bond matrix, such as not greater than about 40 vol %, or even not greater than about 30 vol %. Accordingly, the bond matrix is generally present within an amount of between about 10 vol % and about 30 vol % of the total volume of the final formed bonded abrasive article.

It will be appreciated that the bond matrix includes those compounds that were present initially in the initial glass powder, with the exception of the transition metal oxide reactants. That is, the bond matrix comprises substantially the same composition as that of the glass powder, notably this includes metal oxide compounds described above, and particularly complex metal oxide compounds, and more particularly silicate-based compositions, such as for example, an aluminum silicate, MAS, LAS, BAS, CMAS, or CBAS composition.

As described in the foregoing, the bond matrix has substantially the same metal oxide compounds as the initial glass with the exception of the transition metal oxide reactant, which during sintering, is transformed in situ to a metal nitride compound. As used herein, transition metal nitride compounds include those compounds that were added to the initial glass powder as a transition metal oxide reactant and exist in the final-formed bonded abrasive as a transition metal nitride. Accordingly, transition metal nitride compounds include TiN, CrN, VN, ZrN, and NbN or combinations or complex nitride compounds thereof.

In particular, the total amount of transition metal nitride compounds within the bonded abrasive is generally not greater than about 20 mol %. According to another embodiment, the total amount of one or more transition metal nitride compounds is not greater than about 15 mol %, such as not greater than about 10 mol %. The total amount of transition metal nitride compound within bonded abrasive is typically within a range between about 1.0 mol % and about 20 mol %, or particularly within a range between about 4.0 mol % and about 15 mol %.

In reference to one particular transition metal nitride compound, the bonded abrasive generally includes not greater than about 15 mol % TiN. According to another embodiment, the bonded abrasive includes not greater than about 10 mol % TiN, such as not greater than about 8.0 mol %, or even not greater than about 6.0 mol % TiN. The content of TiN within the final-formed bonded abrasive is generally within a range between about 1.0 mol % and about 15 mol %, and particularly within a range between about 4.0 mol % and about 10 mol %.

The final-formed bonded abrasive article can include other transition metal nitrides, such as CrN. Generally, the bonded abrasive generally includes not greater than about 15 mol % CrN. According to another embodiment, the bonded abrasive includes not greater than about 10 mol % CrN, such as not greater than about 8.0 mol %, or even not greater than about 6.0 mol % CrN. The content of CrN within the final-formed bonded abrasive is generally within a range between about 1.0 mol % and about 15 mol %, and particularly within a range between about 4.0 mol % and about 10 mol %.

Other transition metal nitrides, such as VN can be present within the bonded abrasive article, and generally, the bonded abrasive includes not greater than about 15 mol % VN. According to another embodiment, the bonded abrasive includes not greater than about 10 mol % VN, such as not greater than about 8.0 mol %, or even not greater than about 6.0 mol % VN. The content of VN within the final-formed bonded abrasive is generally within a range between about 1.0 mol % and about 15 mol %, and particularly within a range between about 4.0 mol % and about 10 mol %.

The final-formed bonded abrasive article can include other transition metal nitrides, such as ZrN. Generally, the bonded abrasive generally includes not greater than about 15 mol % ZrN. According to another embodiment, the bonded abrasive includes not greater than about 10 mol % ZrN, such as not greater than about 8.0 mol %, or even not greater than about 6.0 mol % ZrN. The content of ZrN within the final-formed bonded abrasive is generally within a range between about 1.0 mol % and about 15 mol %, and particularly within a range between about 4.0 mol % and about 10 mol %.

Other transition metal nitrides, such as NbN can be present within the bonded abrasive article, and generally, the bonded abrasive includes not greater than about 15 mol % NbN. Generally, the bonded abrasive generally includes not greater than about 15 mol % NbN. According to another embodiment, the bonded abrasive includes not greater than about 10 mol % NbN, such as not greater than about 8.0 mol %, or even not greater than about 6.0 mol % NbN. The content of NbN within the final-formed bonded abrasive is generally within a range between about 1.0 mol % and about 15 mol %, and particularly within a range between about 4.0 mol % and about 10 mol %.

In further reference to the presence of the transition metal nitride compound within the bonded abrasive, generally, the nitride compound is at the interface between the abrasive grains and the bond matrix such that it is in direct contact with the abrasive grains. According to one embodiment, not less than about 50 vol % of the total content of transition metal nitride compound present in the bonded abrasive is in direct contact with the abrasive grains. Still the amount of transition metal nitride compound in direct contact with the abrasive grains can be greater, such as not less than about 60 vol %, or not less than about 75 vol %, or even not less than about 95 vol % of the total volume of transition metal nitride compound within the bonded abrasive.

As the transition metal nitride compound can be formed in direct contact with and at the interface of the abrasive grains and the bond matrix, generally, the transition metal nitride compound covers not less than about 30% of the total available surface area of the abrasive grains. According to other embodiments the transition metal nitride compound covers a greater amount of the abrasive grains, such as not less than about 40%, or not less than about 50%, or even not less than about 75% of the total available surface area of the abrasive grains.

Generally, the bond matrix is a highly uniform phase such that it has either an amorphous phase, crystalline phases, or a combination of both as described above, but notably the bond matrix has limited porosity and bubbles. Typically, the bond matrix has not greater than about 10 vol % bubbles as compared to the total volume of the bond matrix. According to a particular embodiment, not greater than about 5.0 vol % of the bond matrix is bubbles, such as not greater than about 2.0 vol %, or even not greater than about 1.0 vol %.

The thermal expansion coefficient of the bond matrix material is typically low, such as, not greater than about $80\times10^{-7}/K^{-1}$. According to a particular embodiment, the bond matrix has a thermal expansion coefficient not greater than about $60\times10^{-7}/K^{-1}$, such as not greater than about $50\times10^{-7}/K^{-1}$, or even not greater than about $40\times10^{-7}/K^{-1}$. As such, the thermal expansion coefficient of the bond matrix is typically within a range of between about $10\times10^{-7}/K^{-1}$ and about $80\times10^{-7}/K^{-1}$.

The post-sintering bond matrix generally has a flexural strength of not less than about 80 MPa. In other embodiments, the flexural strength of the bond matrix is greater, such as not less than about 90 MPa, not less than about 100 MPa, or in some instances, not less than about 110 MPa. According to a particular embodiment, the flexural strength of the bond matrix is within a range of between about 90 MPa and about 150 MPa.

In addition to such characteristics, the post-sintering bond matrix generally has a toughness of not less than about 0.8 MPa m$^{1/2}$. In other embodiments, the toughness of the bond matrix can be greater, such as not less than about 1.5 MPa m$^{1/2}$, or even not less than about 2.0 MPa m$^{1/2}$.

In reference to properties of the bonded abrasive article, generally the formed bonded abrasive article has a modulus of rupture (MOR) of not less than about 20 MPa. However, the MOR can be greater, such as not less than about 40 MPa, or not less than about 50 MPa, or even not less than about 60 MPa. In one particular embodiment, the MOR of the bonded abrasive article is not less than about 70 MPa, and is typically within a range of between about 50 MPa and about 150 MPa.

In further reference to properties of the bonded abrasive articles, according to one embodiment, the abrasive articles have a modulus of elasticity (MOE) of not less than about 40 GPa. In another embodiment, the MOE is not less than about 80 GPa, such as not less than about 100 GPa, and even not less than about 140 GPa. Generally, the MOE of the bonded abrasive article is within a range of between about 40 GPa and about 200 GPa, and particularly within a range between about 60 GPa and about 140 GPa.

EXAMPLES

Referring to FIG. 2, the first image FIG. 2a, illustrates a portion of a bonded abrasive article according to embodiments herein. As illustrated in FIG. 2a, the portion of the bonded abrasive includes abrasive grains 205 within a bond matrix 207. This sample includes a polycrystalline ceramic phase bond matrix having a magnesium aluminum silicate composition. The sample illustrated in FIG. 2a was fired at 1320° C. for 60 minutes in a nitrogen atmosphere, and was cooled at a rate of between 3.0° C./min and 8.0° C./min. The second image FIG. 2b illustrates a portion of a bonded abrasive article made according to other processes, notably abrasive grains 209 within a bond matrix 211. This sample is a bonded abrasive article having a partially crystallized bond matrix comprising a lithium aluminum silicate. The bonded abrasive of FIG. 2b was fired at 1000° C., for 4 hours in nitrogen. Each of the samples included 50 vol % cubic boron nitride abrasive grains and 16 vol % of the glass powder. Generally, each of the mixtures also included additives in amounts of 15 vol % water and 5.0 vol % of polyethylene glycol for use as a binder. The mixture also included about 14 vol % natural porosity. Each of the samples had approximately 34 vol % porosity, 16 vol % bond matrix, and 50 vol % abrasive grains.

In comparison, the bond matrix 211 of the bonded abrasive in FIG. 2b illustrates a great degree of porosity and bubbling, particularly between the abrasive grains 209. Moreover, the bond matrix 211 is non-uniform in color, illustrating the presence of different phases, particularly an amorphous phase and a crystalline phase. It will be appreciated that the porosity and bubbling between the abrasive grains 209 of the bond matrix 211, define locations of stress concentrations within the bond matrix 211, thus creating a bond matrix more susceptible to fracture and breakage. By comparison, the bond matrix 207 of FIG. 2a includes a uniform material having a high degree of crystallinity, a low degree of porosity and substantially no bubbling between the abrasive grains, as well as effective wetting of the abrasive grains 205.

The following provides particular examples of bonded abrasive articles formed according to embodiments provided herein in comparison to a bonded abrasive article made according to other processes. Table 2 below illustrates glass powder compositions (wt %), otherwise bond matrix compositions, of three samples (Samples 1-3) formed according to embodiments described herein, and a glass powder composition (Comparative Sample) formed according to other processes.

TABLE 2

| | $SiO_2$ | $Fe_2O_3$ | $Al_2O_3$ | CaO | MgO | $Na_2O$ | $K_2O$ | $B_2O_3$ | $TiO_2$ | $Zr_2O$ | ZnO |
|---|---|---|---|---|---|---|---|---|---|---|---|
| Sample 1 | 48.5 | 0.20 | 28.9 | 0.09 | 12.10 | 0.07 | 0.02 | 2.48 | 7.75 | 0.14 | |
| Sample 2 | 44.70 | 0.02 | 27.9 | 0.05 | 14.30 | 0.10 | | 4.85 | 7.90 | | |
| Sample 3 | 55.70 | 0.02 | 17.50 | 0.30 | 19.60 | 0.17 | 0.09 | 2.90 | 3.73 | | |
| Comparative Sample | 50.80 | 0.10 | 18.9 | 0.15 | 18.8 | 0.03 | | 5.36 | 0.02 | | 5.93 |

The formation of the Samples illustrated in Table 2 were formed using the same processes as provided above in accordance with description for the Samples in Table 1. Each of the glass compositions was milled to a powder having an average particle size of about 12 microns and a high amorphous phase content, on the order of at least 80 vol %. The glass powder was then combined with cubic boron nitride abrasive grains having an average grain size of about 115 microns. The mixture included 50 vol % cubic boron nitride abrasive grains and 16 vol % of the glass powder. Generally, each of the mixtures also included additives in amounts of 15 vol % water and 5.0 vol % of polyethylene glycol for use as a binder. The mixture also included about 14 vol % natural porosity.

The samples were then formed into green articles by molding the mixture using a compression mold. After forming, the green articles were pre-fired to a temperature of about 850° C. to evolve organics and low-volatility species and aid in forming the final bonded abrasive article.

After the pre-firing process, the green articles were sintered. Samples 1-3 were sintered at elevated temperatures typically between 1320° C. and 1380° C. for 60 minutes, in an nitrogen-rich atmosphere at about 1.1 atm. Samples 1-3 were cooled at a rate of between 8.0° C./min and 13° C./min. The Comparative Sample was sintered at a temperature of 1050° C. for about 60 minutes in nitrogen. All samples had approximately 34 vol % porosity, 16 vol % bond matrix, and 50 vol % abrasive grains.

Referring to FIG. 3, a plot is provided which illustrates the modulus of elasticity for Samples 1-3 and the Comparative Sample. As illustrated by the plot of FIG. 3, Samples 1-3 demonstrate an improved modulus of elasticity over the comparative sample. Each of Samples 1-3 demonstrate a modulus of elasticity in excess of 100 GPa, and typically at least 120 GPa, and in some instances in excess of 140 GPa. By comparison, the Comparative Sample has a modulus of elasticity of approximately 63 GPa.

Figure 4:
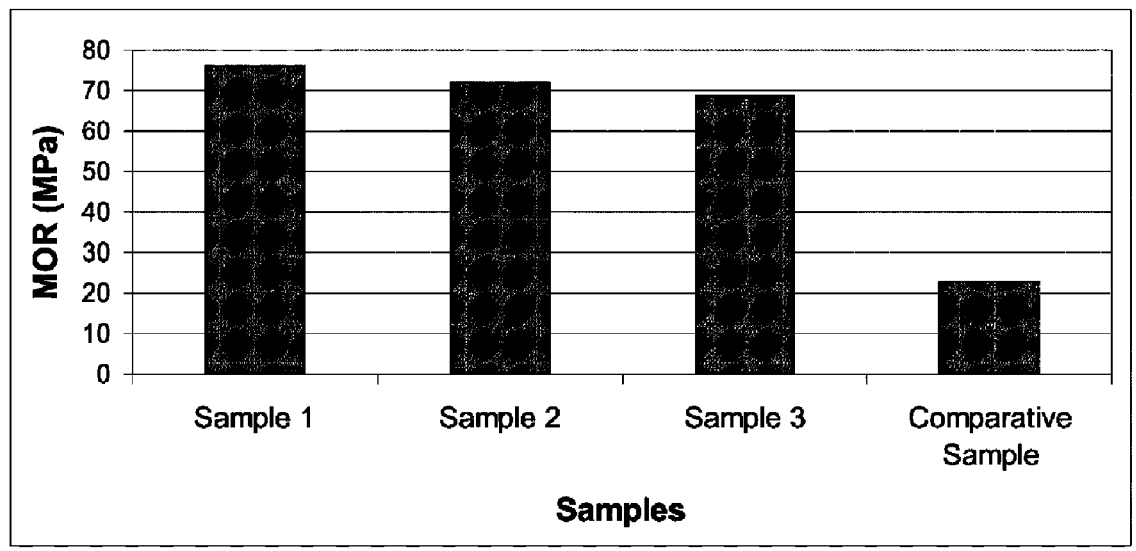
FIG. 4 is a plot illustrating the modulus of rupture (MOR) of bonded abrasive articles formed according to embodiments herein as compared to a Comparative Sample.

Referring to FIG. 4, a plot is illustrated which provides the modulus of rupture of Samples 1-3 and the Comparative Sample. Generally, the bonded abrasive articles of Samples 1-3 demonstrate an improved modulus of rupture over that of the Comparative Sample. Notably, Samples 1-3 have a modulus of rupture (MOR) greater than about 60 MPa, while the Comparative Sample has a MOR of 23 MPa. Notably, Samples 1 and 2 have an MOR in excess of 70, and particularly Sample 1 has an MOR that is about 75, nearly 4 times greater than the comparative sample.

Figure 5:
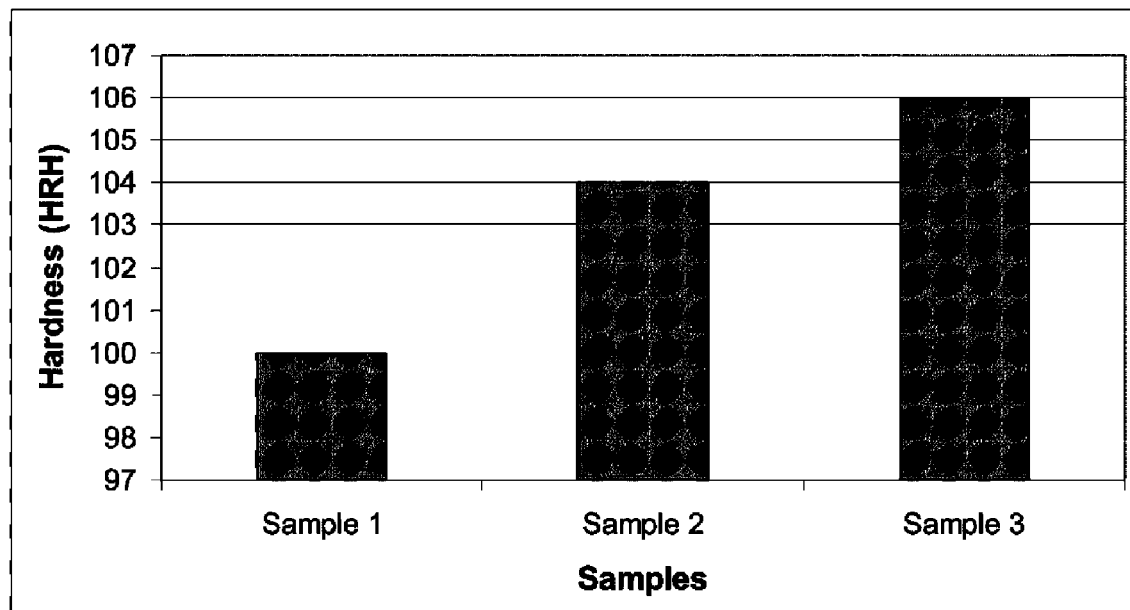
FIG. 5 is a plot illustrating the hardness of bonded abrasive articles formed according to embodiments herein as compared to a Comparative Sample.

Referring to FIG. 5, a plot is provided which illustrates the hardness of the bonded abrasive samples. Notably, each of Samples 1-3 demonstrate a hardness greater than that of the Comparative Sample. Samples 1-3 illustrate a hardness of greater than 90 (Rockwell Hardness H Scale), and typically of at least about 100. In particular, Samples 2 and 3 have a hardness in excess of 100, and Sample 3 has a hardness of nearly 105. The Comparative Sample lacked sufficient hardness for accurate measurement but is expected to have a hardness less than 70.

According to embodiments herein, bonded abrasive articles are provided that have improved properties. While certain references disclose the formation of a coated superabrasive particles in a vitreous bond matrix, such disclosures are limited by their bond matrix compositions, coating processes, and forming processes. Conventional bonded abrasives typically add fluxes to the bond matrix composition to lower the necessary sintering temperature. Lower sintering temperatures are thought to be advantageous for cost, efficiency, and reduced degradation of the bonded abrasive components, namely the abrasive grains. Moreover, conventional coated superabrasives are typically cutting tools having a metal bond matrix, not bonded abrasive articles for grinding applications. In contrast, the embodiments herein utilize a combination of different features including bond matrix compositions, sintering processes, in situ reactions and transformation of oxides to nitrides, and crystallization processes. Additionally, the final formed bonded abrasive articles herein combine a number of features, notably high porosity, superior wetting between the bond and abrasive grains, a high strength bond matrix having low porosity and bubbles, and reaction product transition metal nitride compounds formed at the interface between the abrasive grains the bond matrix.

While the invention has been illustrated and described in the context of specific embodiments, it is not intended to be limited to the details shown, since various modifications and substitutions can be made without departing in any way from the scope of the present invention. For example, additional or equivalent substitutes can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is:

1. A bonded abrasive article comprising:
   abrasive grains comprising cubic boron nitride within a bond matrix comprising a silicate, and a reaction product at the interface between the abrasive grains and bond matrix comprising a transition metal nitride.

2. The bonded abrasive of claim 1, wherein the transition metal nitride compound is selected from the group consisting of TiN, CrN, VN, ZrN, and NbN.

3. The bonded abrasive of claim 1, wherein the transition metal nitride compound comprises TiN.

4. The bonded abrasive of claim 1, wherein the transition metal nitride compound comprises CrN.

5. The bonded abrasive of claim 1, wherein not less than about 50 vol % of the transition metal nitride is in direct contact with the abrasive grains.

6. The bonded abrasive of claim 1, wherein the transition metal nitride covers not less than about 30% of the surface area of the abrasive grains.

7. The bonded abrasive of claim 1, wherein bond matrix comprises bubbles in an amount of not greater than about 10 vol % of the total volume of the bond matrix.

8. The bonded abrasive of claim 1, wherein the bonded abrasive comprises not less than about 5.0 vol % porosity.

9. The bonded abrasive of claim 1, wherein the bonded abrasive has a modulus of rupture (MOR) not less than about 20 MPa.

10. The bonded abrasive of claim 1, wherein the bonded abrasive has a modulus of elasticity (MOE) not less than about 40 GPa.

11. A method comprising:
    providing a glass powder comprising a transition metal oxide compound;
    combining the glass powder with abrasive grains comprising cubic boron nitride;
    forming the glass powder and abrasive grains to form a green article; and
    sintering the green article in a non-oxidizing, nitrogen-rich atmosphere at a transformation temperature to form abrasive grains in a vitreous bond matrix, wherein sintering changes the transition metal oxide compound to a transition metal nitride compound at the interface of the abrasive grains and the vitreous bond matrix.

12. The method of claim 11, wherein the transition metal oxide compound comprises a compound selected from the group consisting of $TiO_2$, $Cr_2O_3$, $V_2O_5$, $ZrO_2$, and $Nb_2O_5$.

13. The method of claim 12, wherein the powder comprises not less than about 4.0 mol % $TiO_2$.

14. The method of claim 11, wherein the transformation temperature is not less than about 800° C.

15. The method of claim 11, wherein the vitreous bond matrix at the transformation temperature comprises not less than about 50 vol % amorphous phase.

16. The method of claim 11, wherein the glass powder comprises a metal oxide compound described by the general equation $aM_2O\text{-}bMO\text{-}cM_2O_3\text{-}dMO_2$, wherein the amount (mol fraction) of the metal oxide compounds comprises $0 \leq a \leq 0.30$, $0 \leq b \leq 0.60$, $0 \leq c \leq 0.50$, and $0.20 \leq d \leq 0.80$.

17. The method of claim 16, wherein the metal oxide compound $M_2O$ comprises one of the metal oxide compounds selected from the group consisting of $Li_2O$, $Na_2O$, $K_2O$, and $Cs_2O$.

18. The method of claim 16, wherein the metal oxide compound MO comprises one of the metal oxide compounds selected from the group consisting of MgO, CaO, SrO, BaO, and ZnO.

19. The method of claim 16, wherein the metal oxide compound $M_2O_3$ comprises one of the metal oxide compounds selected from the group consisting of $Al_2O_3$, $B_2O_3$, $Y_2O_3$, $Fe_2O_3$, $Bi_2O_3$, and $La_2O_3$.

20. The method of claim 16, wherein the metal oxide compound $dMO_2$ comprises one of the metal oxide compounds selected from the group consisting of $SiO_2$, $TiO_2$, and $ZrO_2$.

21. The method of claim 11, wherein the non-oxidizing, nitrogen-rich atmosphere comprises not less than 90 vol % nitrogen.

* * * * *